G. DIAMOND.
BOX MAKING MACHINE.
APPLICATION FILED JUNE 20, 1919. RENEWED SEPT. 21, 1922.

1,435,591.

Patented Nov. 14, 1922.
9 SHEETS—SHEET 1.

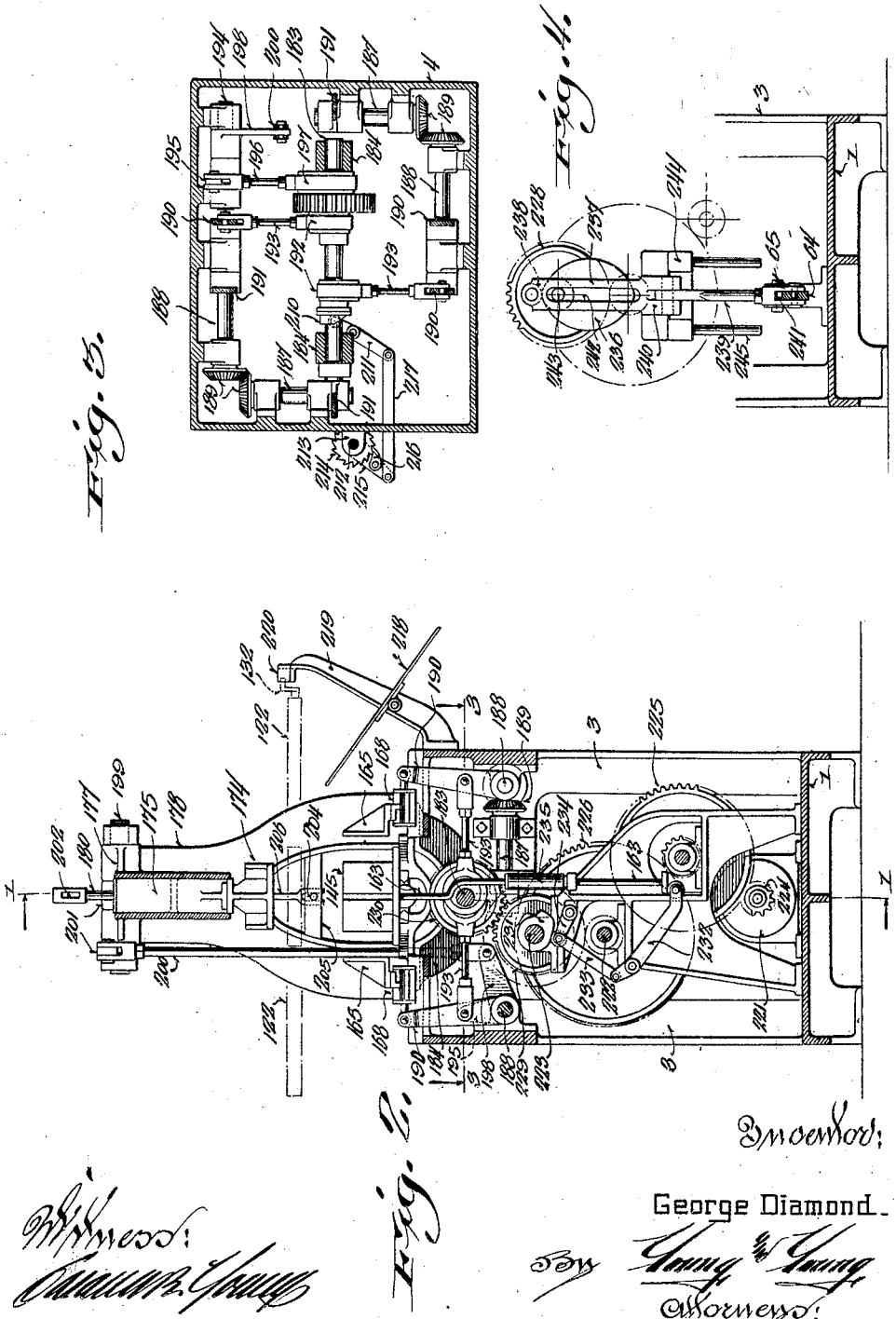

G. DIAMOND.
BOX MAKING MACHINE.
APPLICATION FILED JUNE 20, 1919. RENEWED SEPT. 21, 1922.
1,435,591.  Patented Nov. 14, 1922.
9 SHEETS—SHEET 3.
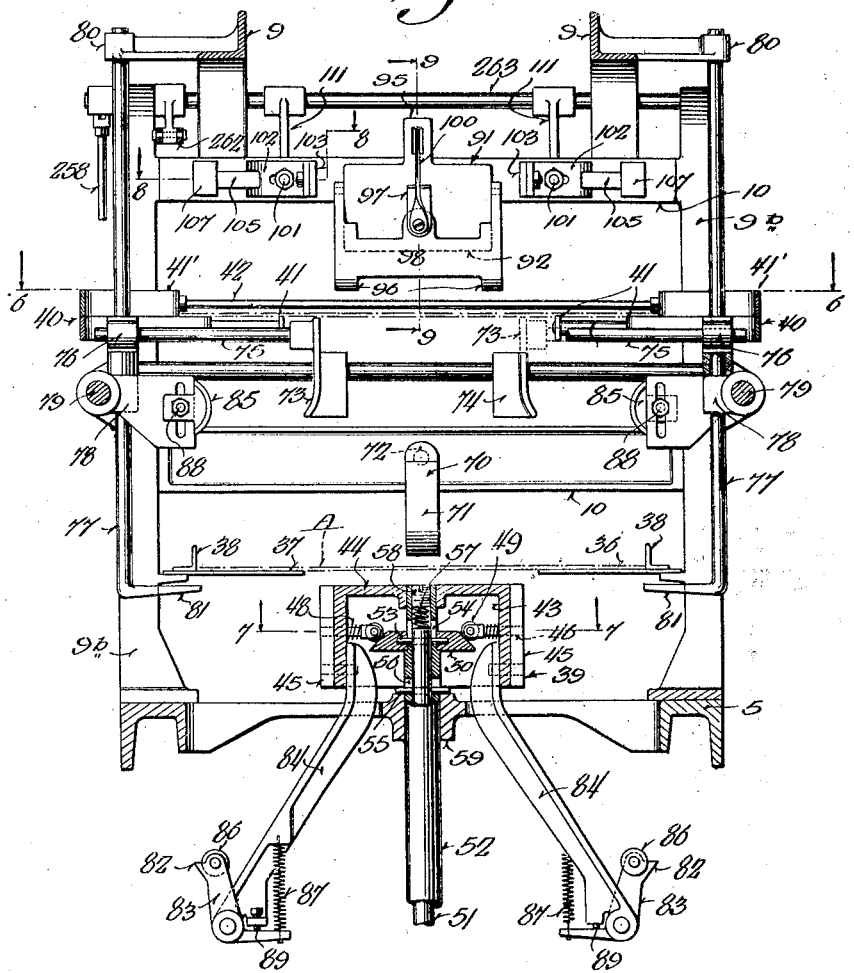

Inventor:
George Diamond

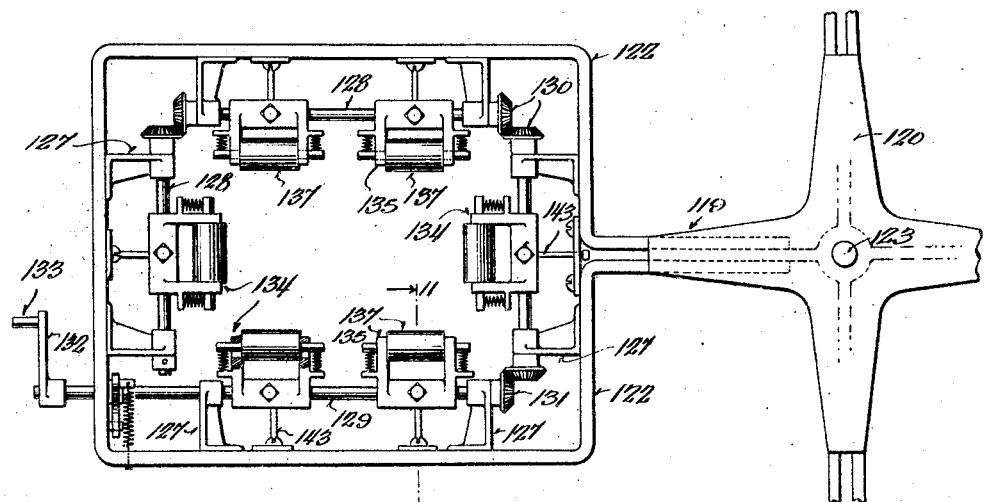
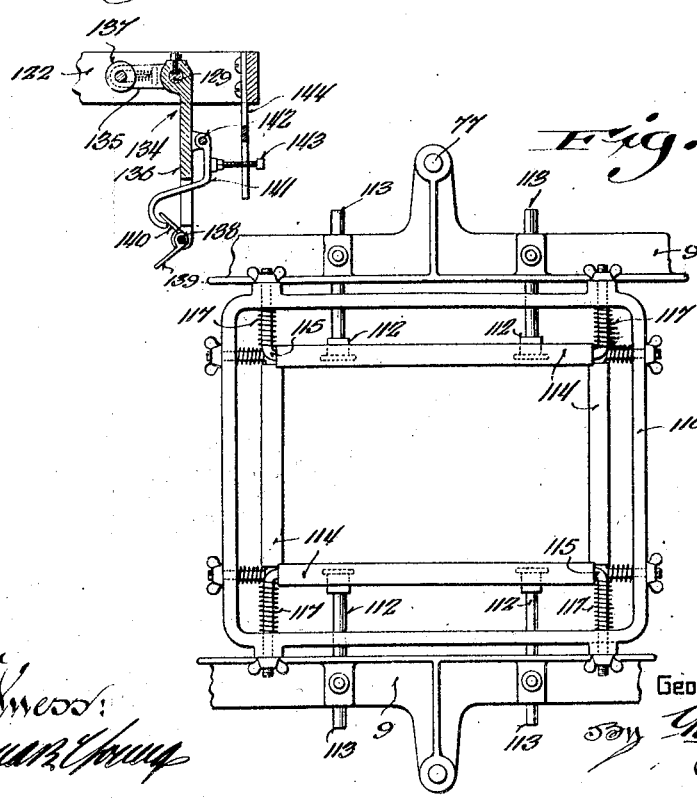

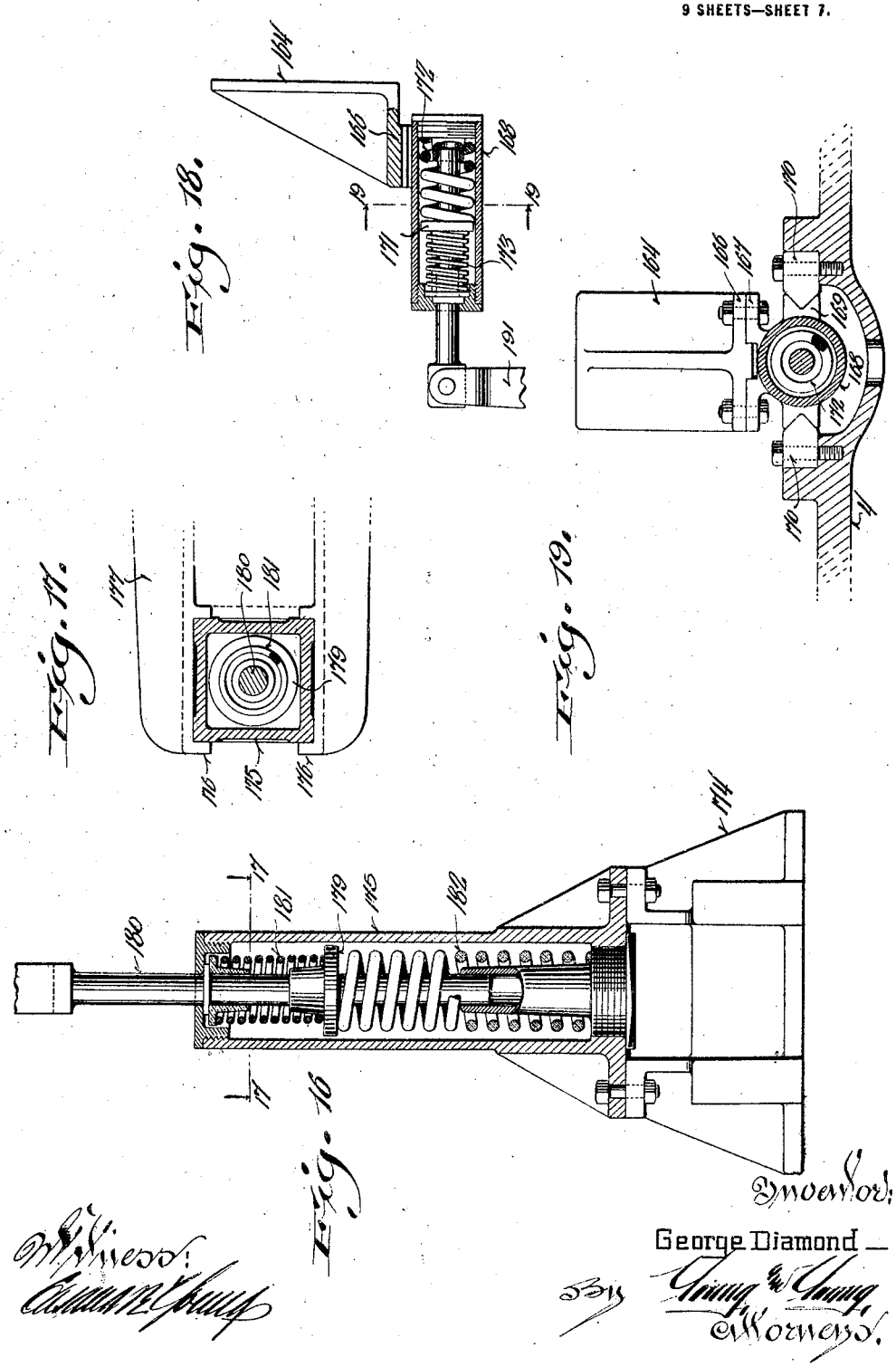

G. DIAMOND.
BOX MAKING MACHINE.
APPLICATION FILED JUNE 20, 1919. RENEWED SEPT. 21, 1922.
1,435,591.
Patented Nov. 14, 1922.
9 SHEETS—SHEET 8.
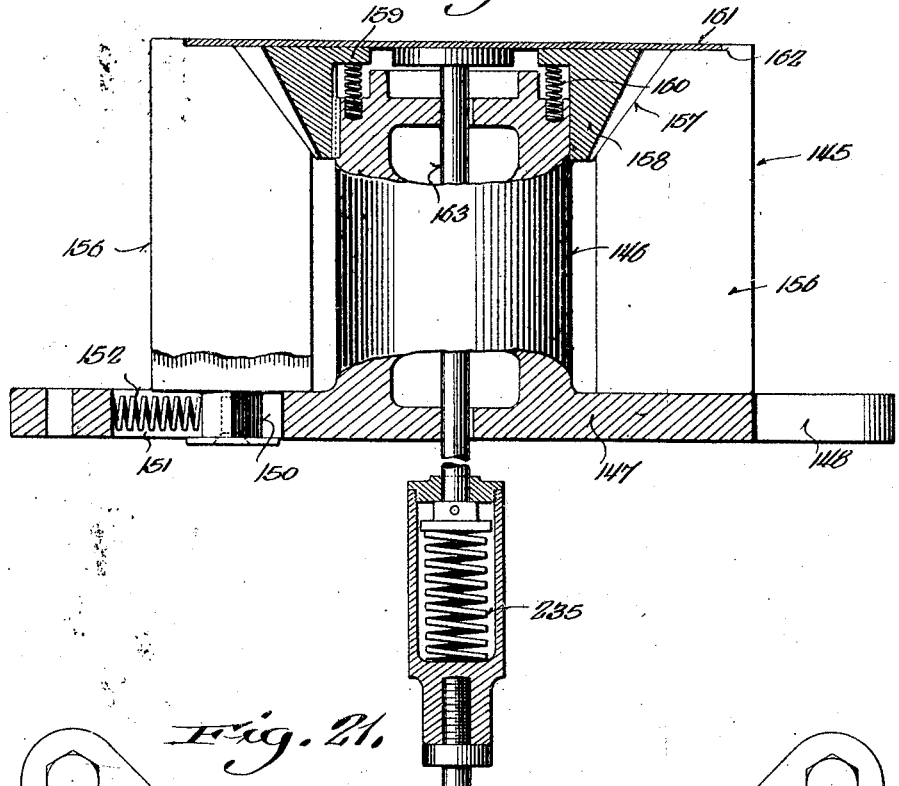
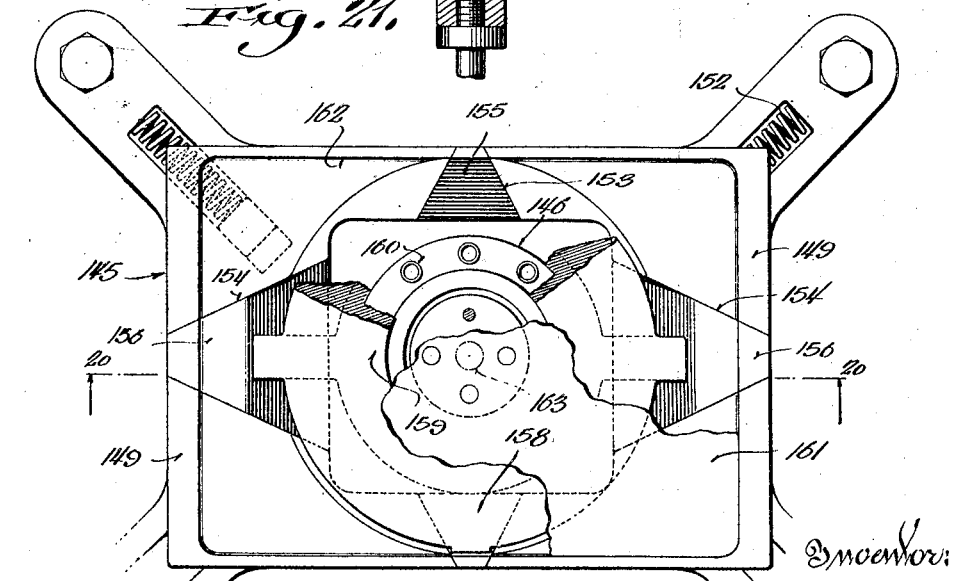

G. DIAMOND.
BOX MAKING MACHINE.
APPLICATION FILED JUNE 20, 1919. RENEWED SEPT. 21, 1922.
1,435,591.
Patented Nov. 14, 1922.
9 SHEETS—SHEET 9.
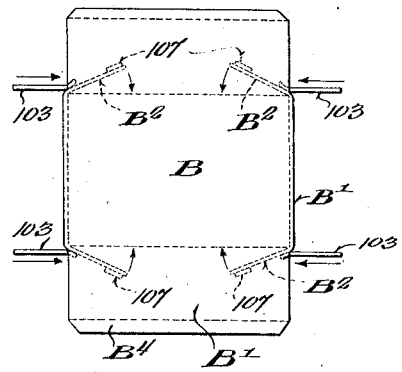
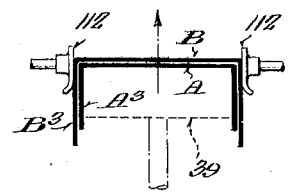
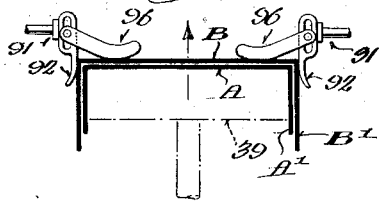
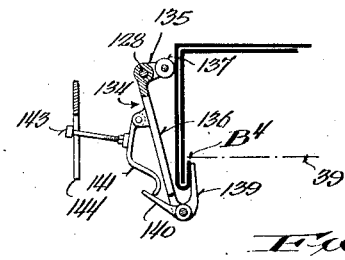
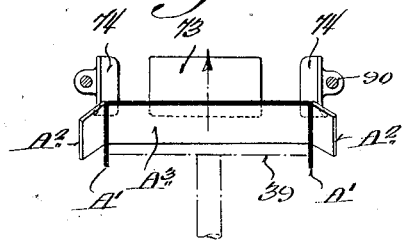
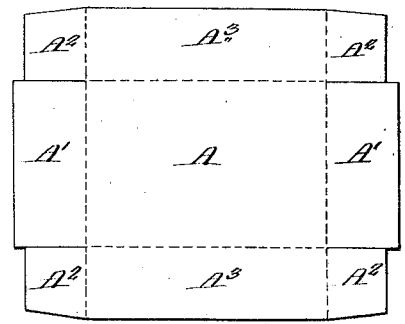
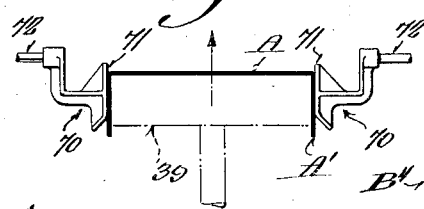
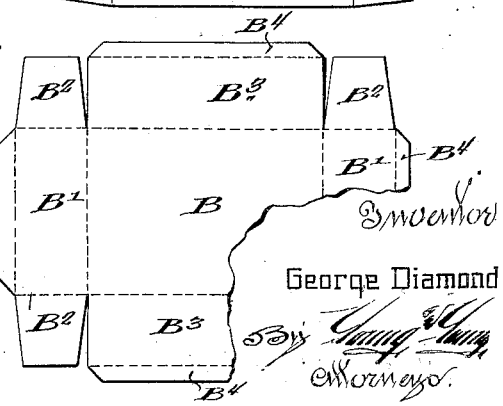
George Diamond Patented Nov. 14, 1922.

1,435,591

UNITED STATES PATENT OFFICE.

GEORGE DIAMOND, OF NEW YORK, N. Y., ASSIGNOR TO PAUL E. DE FERE, OF NEW YORK, N. Y.

BOX-MAKING MACHINE.

Application filed June 20, 1919, Serial No. 305,478. Renewed September 21, 1922. Serial No. 589,718.

*To all whom it may concern:*

Be it known that I, GEORGE DIAMOND, a citizen of the United States, and resident of the borough of the Bronx, in the city, county, and State of New York, have invented certain new and useful Improvements in Box-Making Machines; and I do hereby declare that the following is a full, clear, and exact description thereof.

My invention pertains to new and useful improvements in box making machines, particularly of that type which form boxes from relatively flat paste or cardboard blanks.

One of the important objects of the invention contemplates the provision of a machine in which a plurality of box blanks may be simultaneously operated upon so that several boxes in different stages of completion will be located within the machine at the same time. In this manner blanks may be continuously fed to the machine and the same formed into completed blanks without the waste of any time and in a relatively small space. Although the several stages in the formation of a box are distinct and complete in themselves, yet nevertheless they are corelated and the parts of the machine are so synchronized that each successive operation is dependent upon the treatment immediately preceding it.

In this connection it is also an object to provide an improved mechanism whereby a two-ply box may be formed from independent flat blanks of material, such as pasteboard.

An additional object is to provide means for simultaneously feeding a pair of independent box blanks to the machine, during which operation one of the blanks is coated with adhesive, after which the blanks are successively operated upon by several sets of folders to first bend the inner blank into box-like shape and thereafter fold the cover blank thereabout.

A further important object is to provide a pressing mechanism for shaping the two-ply box, formed as a result of the engagement of two independent box blanks with a plurality of folders, to retain it in permanent form.

A still further object is to provide an improved conveyer for simultaneously moving a plurality of partially formed or completed boxes from the several stages in the box formation.

Other general, as well as minor, objects will become apparent as the description proceeds, and likewise the advantages to be derived from the structure to which said objects relate. The invention resides in the novel features of construction, combination and arrangement of parts which will be hereinafter more particularly described and claimed and shown in the drawings, wherein:

Figure 2 is a vertical transverse section on the plane of the line 2—2 of Figure 1.

Figure 3 is a detail horizontal section on the plane of the line 3—3 of Figure 2.

Figure 4 is a detail vertical section on the plane of the line 4—4 of Figure 1.

Figure 5 is an enlarged detail section on the plane of the line 5—5 of Figure 1.

Figure 7 is a similar view substantially on the plane of the line 7—7 of Figure 5.

Figure 10 is a detail plan view of one of the box carrying frames of the conveyer.

Figure 11 is a section on the line 11—11 of Figure 10.

Figure 12 is a view similar to Figure 10, but illustrating more particularly the initial pressing means.

Figure 16 is a side elevational view, partly in section, of the pressing plunger which carries the pressing die.

Figure 17 is a transverse sectional view through said pressing plunger, the section being on the plane of the line 17—17 of Figure 16.

Figure 18 is a detail longitudinal sectional view of one of the pressing plates and its operating parts.

Figure 19 is a section on the line 19—19 of the pressing plate illustrated in Figure 18.

Figure 20 is a vertical sectional view through the pressing form, the section being taken approximately on the line 20—20 of Figure 21.

Figure 21 is a plan view with parts broken away and in section of the pressing form.

Figures 22 and 23 are diagrammatic views illustrating the steps used in folding the end, side and corner flaps of an inner box blank.

Figures 24, 25 and 26 are similar views illustrating the manner of successively folding the end, side and corner flap portions of a cover blank around the previously formed inner box member.

Figure 27 is another diagrammatic view depicting the final step of folding the edge flaps of the outer box member around the side and end edges of the inner box member.

Figure 28 is a plan view of one of the inner blanks, the score lines thereon showing the lines where the same is to be folded, and Figure 29 is a similar view of a cover blank.

Figure 1:
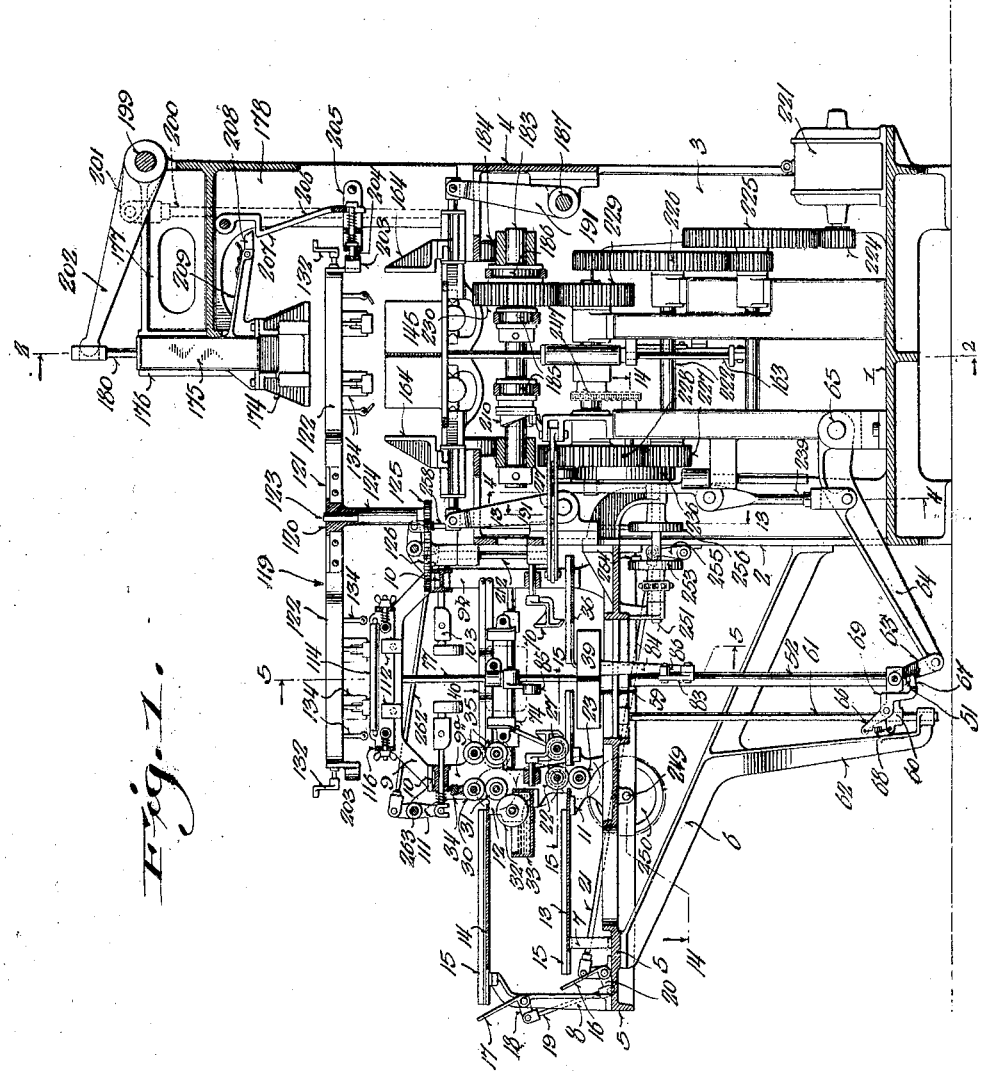
Figure 1 represents a vertical longitudinal sectional view taken substantially on the plane of the line 1—1 of Figure 2.

The box blanks A and B on which my improved machine operates and which are depicted in Figures 28 and 29 respectively of the drawings, are first fashioned on some suitable machine entirely independent of the present box forming machine by slitting the same in the necessary manner and applying the essential score lines. The blank A is somewhat different in size and shape from the other blank B which is in the nature of a cover blank, and although the latter is preferably of the same material as the former, it may be made of light weight cardboard or of paper. That is to say when boxes of a strong type are needed, the blanks A and B are of approximately the same thickness and weight; thus the completed box will be double-walled or of two-ply. On the other hand when strength is not such an essential element the blank B may be made of comparatively light material, in which case it acts merely as a cover or a means for holding the inner blank in its box-like form.

Relatively speaking there are four stages in the formation of a completed box from the flat blanks A and B. The first stage comprises means for feeding an inner blank and a cover blank at the same time to the part of the machine which folds the blanks into box-like shape which consists of the second stage. The first stage, however, also includes means for applying an adhesive to the entire inner face of the cover blank.

In the second stage the cover and inner blanks are located on relatively horizontal trays, which are vertically spaced, in the path of a vertically movable reciprocative forming head. This forming head first engages and moves the inner blank into contact with the end, side and corner folders whereby the same is formed into box-like shape. Immediately succeeding the shaping of the inner blank, it engages the adhesive coated face of the cover blank and carries the same with it during its further movement by the reciprocative forming head, during which movement the end, side and corner flap folders are engaged to thus wrap the cover blank about the sides and ends of the inner blank to which it adheres.

In addition to these several operations, the first stage also includes an initial pressing means whereby the end and side portions of the cover blank are tightly pressed against the corresponding parts of the inner blank. The final step in this stage is the folding of the edge flap portions of the cover blank around the edges of the sides and ends of the inner blank and into engagement with the inner surfaces thereof.

A third stage in my multiple stage box forming machine consists of a final pressing operation in which the two-ply box is stamped into its final and permanent shape. This causes all parts of the cover blank to tightly engage the inner blank and sets the adhesive.

In the final stage the completed and pressed box is merely expelled from the machine. A suitable rotary conveyer transfers the boxes from the second to the third stage for treatment and from the third stage to the point of expulsion from the machine. This conveyer is provided with a plurality of carrying members whereby a plurality of boxes may be in various stages of formation at the same time. In this way there are no lost motions and the output of the machine is materially increased. Attention is called to the fact that extreme compactness of structure is procured by having the principal operating parts of the main stages, that is to say the second and third stages, movable vertically, and the conveyer which shifts the partially completed box from one stage to the other is rotatable in a horizontal plane intersecting the planes of the paths of movement of said principal operating parts.

Referring now more particularly to the various specific features of the invention, it will be seen that all of them are arranged within and supported by suitable framework which includes the base 1 on which vertical frames 2 and 3 supporting a rectangular pressing mechanism frame 4 are mounted. A horizontal frame 5 extends from the front frames 2 and is upheld by a suitable brace bar 6; the major portion of the forming mechanism included within the second stage above referred to is supported on this frame 5.

At the free end of the frame 5 is disposed a pair of vertical brackets 7 and 8, the former being considerably shorter than the latter, while adjacent the other end portion is located a forming mechanism framework including a pair of spaced substantially inverted U-shaped side members 9, the legs of which are connected by frame bars 10. The outer legs 9ª of the members 9 each has a shoulder 11 disposed in the horizontal plane of the top of the bracket 7 and a shoulder 12 similarly positioned with respect to the top of the bracket 8.

An inner blank table 13 is mounted on the bracket 7 and the shoulders 11, and a cover blank table 14 is mounted on the bracket 8 and the shoulders 12. Each of these tables have side retaining flanges 15 which extend longitudinally of the frame 5 so that blanks may be fed and guided from the outer ends of the tables toward their inner ends.

The blanks are simultaneously and mechanically shifted across their supporting tables from the outer toward the inner ends thereof by shifter plates 16 and 17, the first mentioned plate being pivoted at one edge to the frame 5 adjacent the outer end of the table 13, whereas the other plate 17 is similarly connected to the bracket 8 adjacent the corresponding end of the other table 14. A crank 18 extends from the pivot or the like of the plate 17 and is connected by a link 19 with one arm of a bell crank 20 which is fixed to the pivot or the like of the other shifter plate 16. A connecting rod 21 is pivoted to the other arm of the bell crank and extends into the machine to suitable controlling mechanism to be hereinafter more particularly described and claimed.

Adjacent the inner end of the table 13 is disposed upper and lower feed rolls 22 and 23 respectively. Both the upper and lower rolls are carried by vertically spaced and suitably journaled shafts 24 respectively. The bearings for these shafts 24 are carried by the opposite legs 9ª of the member 9, and one end of the upper shaft 24 is extended beyond its bearing and is provided with a spur gear 25 whereby rotation is effected. Rotation of the lower shaft is procured through a second gear 26 on the upper shaft.

Figure 15:
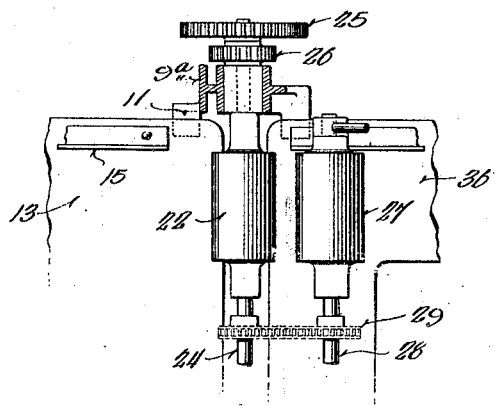
Figure 15 is a vertical sectional view on the plane of the line 15—15 of Figure 1.

Supplemental or auxiliary floating feed rolls 27 are used in connection with the upper rolls 22. Although the shaft 28 of the rolls 27 is positively driven through a drive chain or the like 29 from the upper shaft 24, they are held in engagement with the inner blank, which is being fed from the table 13, by gravity action only. It will be noted from Figure 15 that all of the feed rolls are comparatively short and are located only adjacent the side edges of the inner blank which is to be shifted thereby.

Figure 6:
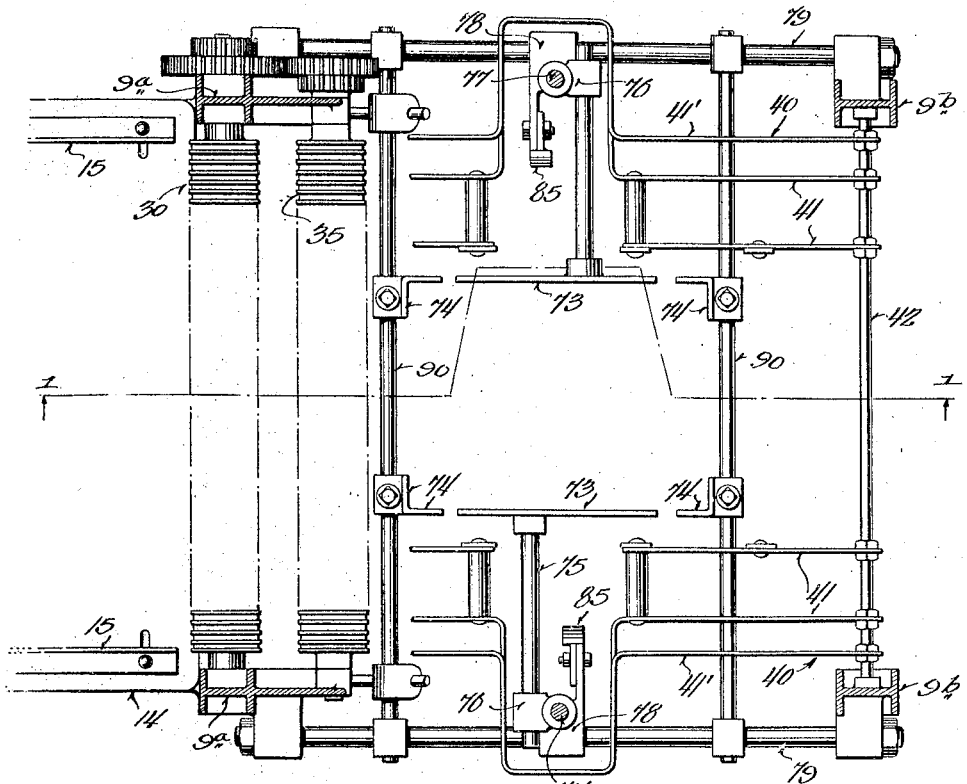
Figure 6 is a horizontal section taken substantially on the plane of the line 6—6 of Figure 5.

At the inner end of the upper table 14 are located two sets of feed rolls, one set in addition to its normal function being adapted to coat one surface of the cover blank with adhesive. From Figures 1 and 6, it will be seen that the last mentioned set includes upper and lower rolls 30 and 31 respectively, both of which extend entirely across the width of the table 14. The lower roll 31 is continuously in engagement with a paste roll 32 which is journaled below the table 14 to ride in a paste receptacle 33. In order that adhesive will be applied only to the under or inner side surface of the cover blank, a brush or the like 34 is positioned to continuously engage the upper roll 30 and remove paste therefrom. The other set of feed rolls 35 is located inwardly of the first described set and the rolls thereof are simultaneously rotated with the rolls 30 and 31 by means of a suitable gear train engaged with the gear 25; the paste roll is likewise operated through this gear train. All of the rolls except the paste applying roll 31 and the paste roll 32 are annularly ribbed as shown in Figure 6, so that any adhesive which they collect will not be distributed over the outer surface of the cover blank.

The feed rolls 22, 23 and 27 adjacent the lower table 13 move the inner blank from this table onto a horizontal tray 36 which consists merely of longitudinally extending supporting plates 37 and edge or guide flanges 38. In other words the central portion of the tray is open to permit a forming head 39 to move therethrough. Referring to Figures 1 and 5, it will be noted that this skeleton tray 36 is supported between and by the legs 9ª and 9ᵇ of the forming mechanism frame.

An upper horizontally disposed skeleton tray 40 is located above the lower tray 36 and in the plane of the upper or cover blank table 14 and in the path of movement of the forming head 39. Figure 1 shows the general location of this tray 40 and Figure 6 its specific construction wherein it will be seen that it consists of a plurality of tray bars 41 connected and supported by rods 42 engaged with the legs 9ᵇ of the members 9. The outermost side bars 41' form guides for engagement by the side edges of the cover blank to properly position the same when it is received by the tray 40 from the feed rolls.

The forming head 39 which is movable through the trays 26 and 40 consists of a hollow form 43 having an open bottom and a flat closed top 44, and a plurality of right-angular face plates 45 which are movable toward and away from the faces of the form 43. Each of the face plates 45 has an inwardly extending stud 46 which projects through an opening in the form 43 and is provided with a roller carrying head 47. Expansile coil springs 48 surrounding the studs and disposed between the heads 47 and the adjacent walls of the form 43 normally urge the face plates inwardly and cause them to engage the outer surface of the latter.

The rollers 49 of the heads 47 are designed to engage the cam faces of an expander cam block 50 which is carried by the upper end of an expander rod 51 slidably mounted in a hollow plunger 52. In Figure 5 it is shown that this cam block 50 and expander rod 51 are connected by a pin 53 projecting through slots 54 in the plunger 52. A second pin 55 extending through the rod 51 and working in slots 56 in the plunger limits the movement of the rod with respect to the latter. An expansile spring 57 located in the plunger between the upper end of the rod 51 and a plug 58 urges the rod downwardly and consequently tends to move the cam block 50 to inactive position. The hollow form 43 is secured to the upper end of the plunger so that the parts carried by both of these members will always be arranged in proper relationship.

The hollow plunger 52 is guided during the reciprocative movement of the forming head 39 in a bearing 59 carried by the frame 5 and by a guide 60 and guide-rod 61. The latter is disposed parallel to the plunger 52 and is supported by the frame 5 and a bracket 62 that depends from the brace bar 6; the guide 60 is fixed to the lower end of the plunger as shown in Figure 1 and is connected by links 63 with an operating lever 64 pivoted as at 65 between ears on the base 1. The means for actuating the lever 64 will be hereinafter particularly set forth.

When the forming head is moving upwardly through the trays 36 and 40, it is desirable that the cam block be active to dispose the face plates 45 in expanded position; on the other hand it is essential that at the end of the upper stroke of the plunger 52, or rather at the limit of upward movement of the forming head, that the latter be contracted. This arrangement is procured in the present instance by a pivoted catch 66 fulcrumed on the guide 60 and having a finger 67 extending beneath the lower end of the plunger 52 and into engagement with the adjacent end of the expander rod 51. An expansile spring 68 normally urges the catch into this position so that the cam block will be disposed in its raised position, but when said limit of travel of the forming head is reached, the shoulder 69 of the catch 66 will engage a portion of the frame 5 and trip the finger 67 from beneath the end of the expander rod 51. The latter together with the cam block 50 will drop and the springs 48 will retract the face plates 45.

When the machine is operating and when an inner blank A has been deposited on the lower skelton tray 36, upward movement of the forming head through the operation of the lever 64 will cause the blank A to be engaged by the flat top 44 of said head and carried upwardly thereby into contact with inner blank end folders 70. These folders include shoes 71 having flat faces disposed parallel to the end faces of the forming head and lower inclined ends, and supporting stems 72 whereby said folders are secured in the frame bars 10. As most clearly shown in Figure 5 inner blank side folders 73 and inner blank corner or flap folders 74 are located immediately above the end folders, so that after the end portions of the inner blank A have been folded into contact with the ends of the forming head, the side and flap portions thereof will be similarly bent.

The side folders 73 also include shoes similar in all respects to the shoes 71 of the end folders, except in width, and which are mounted at the ends of supporting rods 75, the same being fixed in blocks 76 carried by the intermediate portions of vertically disposed and vertically movable folder carrier bars 77. These bars 77 are slidable in bearing guides 78 mounted on frame rods 79 which connect the legs $9^a$ and $9^b$ of the forming mechanism frame and in guides 80 formed in brackets projecting from the top of said frame.

The lower end of each of the carrier bars 77 is provided with a foot 81 which is disposed in the path of the trip arm 82 of a bell crank lever 83 pivoted to a bracket 84, the latter member being fixed to said hollow form 43 of the forming head 39. Thus as said forming head moves vertically, the trip arms 82 will be carried therewith and into engagement with the feet 81. The contact between these last two parts is so timed that the side folders 73 will be caused to move in unison with the forming head 39 immediately after the side portions of the inner blank have been engaged and bent. Such portions are thereby positively retained against the side faces of the forming head during a predetermined interval of time.

At the end of this time and after the side folders have traveled a predetermined distance, the arms 82 are disengaged from the feet 81 by means of trips 85 carried by said frame rods 79. These trips are cam faced and engage cam rollers 86 on the arms 82 and thus urge the latter inwardly and out of contact with said feet; the arms are also urged in this direction against tension of contractile springs 87. For the procurement of accurate operation of the foregoing described parts of the machine, the trips 85 are adjustable on the parts on which they are mounted, for instance in the manner shown at 88 in Figure 5, and likewise the bell cranks 83 are adjusted by set screws or the like 89.

Immediately upon the disengagement of the trip arms 82 from the feet 81, the side folders 73 and the carrier bars 77 thereof drop by gravity to their initial positions. With the exception of the movement of these side folders 73, all of the folders for the inner blank A are relatively stationary, they being somewhat adjustable, however, so that maximum efficiency and accurate results may be obtained. In this respect the corner or flap folders 74, which are right-angular in cross section as shown in Figure 6, are mounted on stationary supporting rods 90 connecting the frame rods 79.

Figures 8, 9:
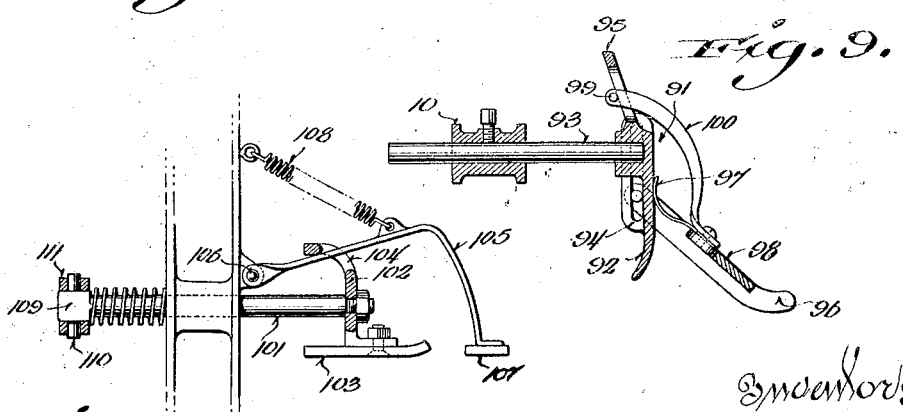
Figure 8 is a detail horizontal section on the line 8—8 of Figure 5.
Figure 9 is a similar vertical section on the plane of the line 9—9 of Figure 5.

The inner blank A having been completely folded about the forming head 39, the cover blank B is engaged and lifted from its skeleton tray 40 and carried into contact with cover blank end folders 91. Each of these end folders 91 includes a folding plate or shoe 92 fixed to a supporting rod 93, a pair of slotted pivot flanges 94 disposed at the ends of said plate, and a slotted guide or stop ear 95 projecting from the top of the latter. The rods 93 are adjustably secured in certain frame bars 10. Top pressing arms 96 are slidably pivoted in the slots of the flanges 94, the free ends of said arms being normally urged downwardly by a return spring 97 which is carried by the member 98 connecting said arms and bears against the plate 92. Downward movement is limited, however, by the stop 99 on the end of a guide arm 100 engaging the stop ear 95. Referring to Figure 9 it will be seen that the arm 100 slides through the slot in the ear 95, which slot being considerably longer than the width of the arm 100 permits the pivots of the pressing arms 96 to move vertically in the slots of the flanges 94. Normally the pressing arms 96 are located in the direct path of movement of the forming head, consequently the central portion of the cover blank will be engaged thereby simultaneously with the bending of the end portions by the plates 92. However, as upward movement of the forming head and the blanks carried thereby proceeds, the pressing arms are moved upwardly and laterally out of said path of travel of the former and against the tension of the spring 97.

The corner flaps of the cover blank are parts of the end portions of the blank folded by the plates 92, so prior to the folding of the side portions of said cover blank, these flaps are bent inwardly into engagement with the sides of the inner blank. The preferred construction of the cover blank flap folders is depicted in Figure 8; their general relationship with the other parts of the machine, are, however, shown in Figure 1. Although there are four of these flap folders, the construction and operation of each is similar, consequently the specific formation of the one illustrated in Figure 6 will be alone described.

A reciprocative push-rod 101 is slidably journaled in a bearing formed in one of the bars of the forming mechanism frame and has a substantially right-angular carrying plate 102 secured to its inner end. A main folding shoe 103 is secured to one arm of the carrying plate, while the other arm is curved outwardly slightly and slotted as at 104 for the reception of one end portion of a lever 105 which is pivoted as at 106 to said frame bar. The lever 105 is substantially right-angular in shape and the end thereof remote from the pivot point 106 is provided with an auxiliary folder shoe 107. A contractile spring 108 is fixed to said frame bar and to said lever 105 at a point on the opposite side of the carrying plate 102 from the pivot 106. The outer end of the push-rod 101 is provided with a head 109 which also includes oppositely extending pintles 110 with which the bifurcated end of a level 111 is engaged.

The lever is rocked in a manner to be hereinafter described and reciprocates the rod 101 to move the main folder shoe 103 parallel to one side face of the forming head 39. At the same time the auxiliary folder shoe 107 is moved toward or away from said forming head face. Thus when the rod is moved inwardly a flap portion of the cover blank is engaged by the shoe 103 adjacent its connection with the end portion of said blank, while the auxiliary shoe is moved inwardly into contact with the free end of the flap (see Figure 25). Inward movement of the auxiliary shoe is obviously procured by the engagement of the curved end of the carrying plate 102 with the adjacent portion of the lever 105.

Stationary side folders 112 are located above the flap folders just described and bend down the side portions of the cover blank as the same is moved into engagement therewith. These folders 112 are preferably substantially similar to the folders 71 and are mounted on stems 113 adjustably supported in the members 9 of the forming mechanism frame. As indicated in Figure 12, two of the folders 112 are provided for each side portion of the blank. This operation completes the folding of the cover blank with the exception of the edge flaps designated as $B^4$ in Figure 29, but prior to this last step it is essential that the ends $B^1$, the flaps $B^2$, and the sides $B^3$ be tightly engaged with the corresponding portions of the inner blank A and all possible wrinkles and irregularities removed. Therefore the partially completed box is put through an ironing operation which is performed by four pressing rollers 114 arranged in the form of a rectangle of a size somewhat smaller than that of the forming head 39. Each of these rollers is journaled on a base portion of a yoke 115, the arms of which are slidable in a substantially rectangular supporting frame 116. Expansile coil springs 117 are disposed on said arms between the base portions of the yokes and the frame 116 so that the rollers 114 when engaged by the partially formed box carried by the forming head will be urged outwardly against the tension of said springs. Since the partly finished box is moved upwardly in an inverted position the pressing rollers 114 will commence their ironing operation on the portions of the sides and ends of the box adjacent their connections with the bottom.

Rotatable in a horizontal plane above the top of the forming mechanism frame is a conveyer 119 which comprises a central hub 120 and radial arms 121, preferably four, to each of which is fixed a box holding frame 122 of substantially rectangular shape. The hub is fixed to a vertical shaft 123 which is journaled in a suitable bearing 124 and has a driving gear 125 keyed thereon and meshed with a second gear 126 driven by means to be hereinafter more particularly set forth.

Each of the box holding frames 122, one of which is clearly illustrated in Figure 10, has a plurality of bearing brackets 127 extending inwardly therefrom, in the bearings of which are journaled rock shafts 128 and 129, the adjacent ends of all of the three shafts 128 being connected together by bevel gears 130, while one end of the shaft 129 is similarly connected as at 131 to one end of one of the first mentioned shafts. The other end of this shaft 129 extends outwardly of the frame 122 and is provided with a crank 132 on which is a trip 133. Movement of the crank will obviously rock the shaft 129 and through the gears 131 and 130, the other rock shafts 128.

On each of the shafts 128 and 129 is loosely fixed one or more bell cranks 134, that is to say each of these bell cranks while being movable with the rock shafts, are shiftable independently thereof to a limited degree, (see Fig. 11). The box holding arms 135 of the bell cranks are normally disposed substantially horizontal, whereas the folder carrying arms 136 are positioned vertically; the first mentioned arms each are provided with a spring actuated box engaging roller 137. From Figure 10 it will be noted that the several rollers 137 are arranged in the form of a rectangle, the size of which is approximately that of a box which has been formed about the head 39 from the inner and outer blanks A and B respectively.

Each of the other arms 136 of the bell cranks has its lower end bifurcated and between the furcations thus formed is pivoted an edge folder 138 in the form of a substantially rightangular member, one arm of which forms a folder finger 139. The other arm 140 thereof is engaged by the hooked end of a folder actuating lever 141 pivoted at its end remote from the hook as at 142 to the outer face of the folder carrying arm 136. To the lever 141 is fixed an extensible stop 143 which is designed for engagement with a stop plate 144, the latter being secured to the frame 122. It will be appreciated that when the bell cranks 134 are rocked so as to move the folder carrying arms 136 inwardly, the stops 143 will engage the stop plates 144 to thus prevent extended movement of the levers 141 with the result that the hooked ends thereof will move the folder fingers 139 into substantially vertical position as indicated more or less diagrammatically in Figure 27.

As hereinbefore mentioned the third stage in the formation of a box comprises means for pressing the partially completed box to shape it into its permanent form and to procure a more perfect contact between the inner portion and the cover or outer portion. This mechanism includes an expansile and contractile pressing form 145, the size of which when expanded is similar to that of the box when complete. The specific construction of this form 145 is illustrated in Figures 20 and 21, wherein it will be seen that the stationary portion comprises a substantially cylindrical head 146 mounted on a pressing table 147 from which extends radial spider arms 148 in turn connected to the top portion of the part 4 of the presser frame. Disposed around the head 146 and arranged in the form of a rectangle are four substantially rightangular corner blocks 149, each of which has a depending lug 150 that is disposed through and slidable in a slot 151 formed in the adjacent spider arm 148. An expansile spring 152 located in each of said slots 151 and engaged with one end thereof and with the adjacent lug 150 urge the corner blocks toward the head 146.

The inner faces of each of the corner blocks 149 are beveled as at 153 and 154 for engagement with expander blocks 155 and 156 respectively. The inner upper edges of the blocks 155 and 156 are in turn beveled downwardly and inwardly as at 157 for sliding contact with the inclined faces of a cam 158. This cam has a central circular opening for sliding engagement with the head 146 and is provided with the radially inwardly extending flange 159, between which and the top of the head 146 is disposed a plurality of expansile helical springs 160. Obviously downward movement of the cam 158 will tend to move the expander blocks 155 and 156 outwardly to thereby shift the corner blocks away from each other against the tension of the springs 152.

Normally, however, said springs 160 urge the cam 158 from its operative position as shown in Figure 20. Therefore for the purpose of mechanically operating the cam 158, a follower plate 161 is disposed on the top of the pressing form and when in engagement therewith is positioned in a seat 162. Said plate is fixed to the upper end of an operating rod 163 which is slidable through the head 146 and operated in a manner to be hereinafter more particularly described.

For co-operation with each end of the pressing form 145, I provide a pressing plate 164 and for co-action with each side thereof a pair of pressing plates 165 are used. All of these pressing plates are substantially identical in construction and are movable toward and away from the pressing form in synchrony with the expansion and contraction thereof. The enlarged views, Figures 18 and 19 illustrate the preferred shape and mounting of the pressing plates. Therefore referring to these figures, as well as to Figures 1 and 2, it will be noted that each of the plates has a flat face parallel to the face of the pressing form with which it co-operates and is provided with an attaching flange 166 whereby it is secured to an attaching portion 167 of a cylinder 168. From diametrically opposite points on the cylinder project guides 169 which operate with tracks 170 carried by the top of said portion 4 of the presser frame.

Within each of the cylinders 168 is located cushioning or shock-absorbing means preferably in the nature of helical springs. A piston 171 is slidable in each of the cylinders 168 and on one side thereof is positioned a heavy coil spring 172 while on the other is a relatively light coil spring 173. As a result an even and firm pressing action is obtained when the pressing plates 164 and 165 are moved toward and engaged with their corresponding faces of the pressing form 145.

The bottom of the box which is positioned on the pressing form 145 is engaged and pressed between said form and a die 174 carried by a vertically reciprocative plunger 175. This plunger is slidable in guides 176 carried by the overarm 177 of the upper portion 178 of the presser frame. The plunger 175 comprises a cylinder in which a piston head 179 is slidable, this piston head being carried by a piston rod 180 and engaged on one side by a relatively light, expansile coil spring 181 and on the other side with a heavier expansile coil spring 182. This provides cushioning means as in the case of the pressing plates 164 and 165.

Because of the substantially simultaneous operation of the several pressing members including the plates 164 and 165 and the die 174, the operating means is relatively similar in construction and actuation. A main drive shaft 183 is disposed beneath the pressing table 147, it being journaled in the bearings of brackets 184, and has a pair of similar eccentrics 185 and a third eccentric 186 different from the others mounted thereon for rotation therewith. Also disposed beneath the pressing table 147 are a plurality of rock shafts 187 and 188 journaled in bearings carried by the portion 4 of the presser frame. One of the shafts 187 is connected to the adjacent shaft 188 as at 189, and the other rock shaft 187 is similarly connected to the other rock shaft 188. Each of the shafts 188 is provided with a crank 190, and these rock shafts as well as the shafts 187 are provided with presser operating cranks 191 which are connected with the rods of the pistons 171 of the pressing plates 164 and 165. Each of the eccentrics 185 is provided with a band 192, connecting rods 193 being provided to connect the bands with the eccentric cranks 190.

Another rock shaft 194 is journaled to said portion 4 of the presser frame and is connected through an eccentric crank 195, a connecting rod 196 and an eccentric band 197 with the eccentric 186. A plunger crank 198 is fixed to the rock shaft 194 and operates a rock shaft 199 by means of a connecting rod 200 and a crank 201. Oscillation of the shaft 199 causes the orbital movement of the end of an operating lever 202 loosely connected with said piston rod 180. The rotation of the main drive shaft 183 thus causes the rocking of the shafts 187 and 188 and a reciprocation of the pressing plates 164 and 165, and the reciprocation of the pressing plunger 175 and its die 174 through the oscillation of the rock shafts 194 and 199.

It has already been pointed out that the conveyer 119 is adapted to transfer a partially completed box from the second stage of the machine to the third stage and from the latter to the last or expulsion stage. It is necessary, however, to lock the conveyer when it is not rotating to thereby accurately position the same. The preferred retaining means shown in Figure 1 includes a plurality of latch plates 203, one being carried by each of the frames 122, and a spring actuated detent 204 normally in a position to snap into the seats of either of the latch plates as the same are brought into engagement therewith. The detent is supported in a bracket 205 carried by the portion 178 of the presser frame. The detent is shifted to inactive position by a releasing lever 206 pivoted to said portion of the frame, said lever having a cam face 207 for cooperation with a trip finger 208 pivotally mounted on the end of a trip arm 209 fixed to and movable with the pressing plunger 175. It will be noted that as the plunger moves downwardly, the trip finger 208 rides over the shoulder at the termination of the cam face 207 and the lever 206 is not shifted. But, on the upward movement of the plunger 175 said cam face 207 is engaged by said trip finger 208 and the lever is swung to a position to release the detent 204.

When the conveyer 119 is free to move, it is rotated as a result of the rotation of the main drive shaft 183 on which is fixed a cam 210, the cam face of which rocks a lever 211. The hereinbefore mentioned gear 126 is fixed to a vertical shaft 212 journaled in suitable bearings 213 on the presser frame, and likewise a ratchet wheel 214 is fixed thereto. A crank 215 loosely mounted on said shaft 212 carries a pawl 216 for cooperation with the teeth of said ratchet wheel, and rocking of said lever 211 is converted to a rotary motion and transmitted to the shaft 212 through a connecting bar 217 and the pawl and ratchet arrangement. The reciprocation of the pressing plunger 175 and the rotation of the conveyer 119 is thus readily synchronized by having the actuating means for both controlled through the rotation of the main drive shaft 183.

When the conveyer moves a box from the pressing treatment stage, it is released from its holding frame 122 when it is over a chute 218; the chute expels the box from the machine. The bracket 219 supporting the chute also carries a box releasing finger 220 which is successively engaged by the several trips 133 as they are moved therepast during the rotation of the conveyer. The engagement of the releasing finger 220 with one of the trips causes the rock shafts 128 and 129 of the adjacent box holding frame to be oscillated, the bell cranks 134 thereof to be rocked, and the box to be released.

Any desired means may be utilized for operating the drive shaft 183 and the other mechanisms, such as an electric motor 221. Two intermediate shafts 222 and 223 are connected with the driving gear 224 of the motor through reducing gears 225 and other gears 226, 227 and 228, the gears 226 and 227 being on the shaft 222 and the gear 228 on the shaft 223. The rotation of the last mentioned shaft is transmitted to the drive shaft 183 by a gear 229 on the former and a gear 230 on the latter.

The expander rod 163 of the pressing form expanding means is elevated or moved to inactive position by the actuation of a cam 231 on the shaft 223, an intermediately pivoted lever 232 and a link 233. One end of the lever 232 engages the lower end of the rod 163 and the link is pivoted to the other end at one end, the opposite end of the link being intermittently engaged with said cam 231. The link 233 is held in operative position by means of a retaining member 234 as shown in Figure 2. A shock absorbing means 235 is disposed in the intermediate portion of the rod 163.

The plunger 52 together with the forming head 39 is also reciprocated by simple mechanism connected with the gear 228. This mechanism comprises an eccentric plate 236 fixed to the gear 228, a follower 237 having a follower roller 238 carried thereby for engagement with the periphery of the eccentric plate 236, and a link 239 hinged as at 240 to the follower and pivotally connected as at 241 to the forming head lever 64. The follower 237 is provided with a longitudinal guide-slot 242 for coaction with a guide pin 243 extending from the eccentric plate concentrically of the gear 228. The follower is further guided in its vertically reciprocating movement by means of guides 244 slidably receiving guide rods 245, the latter being carried by said follower 237.

A shaft 246 is journaled in bearings carried by the presser frame and by the horizontal frame 5 and is driven from the shaft 223 by a sprocket chain connection 247. One end of this shaft 246 is connected by means of bevel gears 248 to a short shaft 249 extending transversely thereof and carrying a gear 250 for actuating the gears driving the several feed, paste and paste applying rolls.

The shaft 246 also drives a shaft 251 disposed parallel thereto and journaled in bearings also carried by the presser frame and the horizontal frame 5, the connection between these two shafts being by means of sprockets and sprocket chains 252. A cam disk 253 is fixed to the shaft 251 and has a finger 254 thereon for intermittent engagement with a crank 255 with which the connecting rod 21 is attached. The rotation of the cam disk 253 thus causes the shifter plates 16 and 17 to be actuated.

A second cam disk 256 is likewise fixed to the shaft 251, its cam finger intermittently engaging a trip lever 257. A lift rod 258 is pivoted to the trip lever 257 and to a crank 259 of a rock shaft 260 journaled on a portion of the forming mechanism frame. Certain of the cranks on the rock shaft 260 are connected with the heads 109 of the cover blank flap folders, and still another crank 261 through a connecting rod 262 rocks a shaft 263 to which the levers 111 are fixed.

The operation of the machine constructed in the manner above set forth is substantially as follows: The operator, who is located at the blank table end of the machine, places an inner blank A on the table 13 and a cover blank B on the table 14, such blanks being successively fed to their respective tables as soon as the latter are emptied of the blanks first deposited thereon. Although no provision is so illustrated in connection with the present invention, it is obvious that the tables 13 and 14 may be mechanically supplied with the proper blanks as well as by manual operation, but with the machine described all of the succeeding operations are entirely mechanical and automatic.

That is to say at the proper time the cam finger 254 of the cam 253 will cause the actuation of the rod 21 and the simultaneous movement of the shifter plates 16 and 17 into the openings cut in the outer edge portions of their respective tables 13 and 14, the blanks thereon being thereby forcibly moved inwardly of the machine and into engagement with the feed rolls. The rolls co-operating with the lower table 13 move the inner blank A onto the lower skeleton tray 36, whereas the upper set of feed rolls not only shift the cover blank onto its skeleton tray 40, but simultaneously coat the inner surface thereof with suitable adhesive from the paste receptacle 33.

After this positioning of the two blanks in the forming mechanism, the forming head 39 is elevated from its initial lowered position shown in Figure 1 by the raising of the operating lever 64 through the instrumentality of the mechanism shown most particularly in Figure 4. The inner blank being first engaged by the upwardly moving forming head, is lifted thereby and its end portions $A^1$ are contacted with the end folder shoes 71, such portions being thereby bent laterally to form the ends of the box as indicated in Figure 22.

Next the flaps $A^2$ and the side portions $A^3$ of the blank A are simultaneously engaged with the side folders 73 and flap folders 74, the latter portions being thus bent laterally to form the sides of the box, and the flaps bent into engagement with the ends $A^1$ (see Figure 23). The flap folders 74 like the folders 70 are stationary, but as hereinbefore explained the side folders 73 are vertically movable and after being engaged by the side portions of the blank A are caused to remain in such relation by the engagement of the trip arms 82 with the feed 81 of the folder lifting mechanism of which the carrier bars 77 form a major part.

Immediately after all of these portions $A^1$, $A^2$, and $A^3$ are folded to form the inner shell of a box, the cover blank B is engaged and carried upwardly with the still rising forming head into contact with the cover blank end folders 91 and the top pressing arms 96 thereof. The portions $B^1$ of the blank B are thereby bent or folded laterally as shown in Figure 24. The specific function and operation of the top pressing arms 96 has already been set forth.

Figure 13:
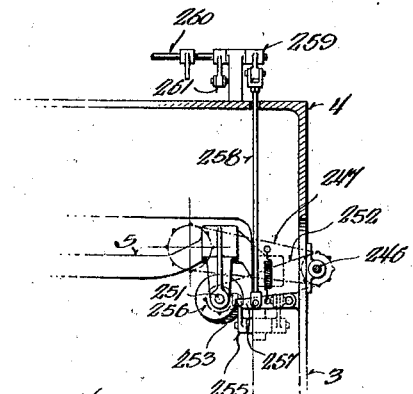
Figure 13 is a vertical sectional view taken substantially on the plane of the line 13—13 of Figure 1.
Figure 14:
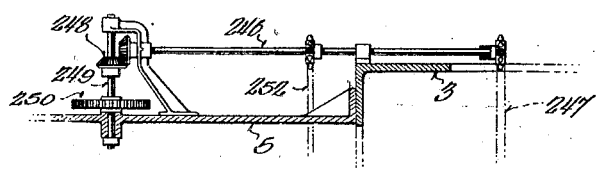
Figure 14 is a horizontal section approximately on the plane of the line 14—14 of Figure 1.

The end portions $B^1$ having been folded, the flaps $B^2$ may then be bent against the side portions $A^3$ of the inner blank by the main and auxiliary flap folder shoes 103 and 107 respectively. These shoes are operated by the actuating mechanism shown in Figure 13 which is connected therewith through suitable rock shafts, cranks and connecting rod, such as the crank or lever 111, rock shaft 263 and connecting rod 262. Immediately prior to the operation of these flap holders, the side folders 73 are released from engagement with the side portions $A^3$ of the inner blank by the tripping of the arms 82, the means carrying said folder 73 being returned to initial position by a gravity action.

The side portions $B^3$ are after this last mentioned folding operation of the shoes 103 and 107 bent laterally by stationary side folders 112. Proceeding upwardly the folded and pasted blanks are acted upon by the ironing mechanism, consisting of the pressing rollers 114 to initially press the sides and ends of the newly formed box.

The horizontal disposed rotary conveyer 119 located immediately above the forming mechanism and between the pressing mechanism is held stationary and in locked position during predetermined intervals of time, and when so locked one of the box holding frames 122 is disposed directly in the path of movement of the forming head 39. Thus after the folded blanks have been acted upon by the pressing rollers 114, they are forced by the forming head 39 into the holding frame 122 and the arms 135 of the several bell cranks 134 are engaged and the latter shifted as indicated in Figure 27 to cause the edge flaps $B^4$ of the cover blank to be bent laterally and inwardly into engagement with the inner surface of the inner blank A. These bell cranks together with the folder fingers 139 thereof not only cause the folding of said flaps $B^4$ but also retain the box in the holding frame. This being the limit of upward travel of the forming head, the same is contracted and lowered from out of the box and downwardly to its initial position indicated in Figure 1. The shifter plates 16 and 17 may then be again actuated to supply new blanks to the trays 36 and 40.

As the reception of the box in the holding frame 122 disposed over the forming mechanism completes the forming operation, or in other words the second stage, the conveyer is rotated ninety degrees to dispose an empty holding frame in the position occupied by the loaded frame, and then remains in stationary locked position until a second box is formed with a pair of blanks in the same manner as the box just described. Another rotation of the conveyer through ninety degrees will bring the first loaded holding frame 122 over the pressing form 145 and below the pressing die 174. At the same time a third empty holding frame is moved over the forming mechanism to receive a third box.

While the conveyer remains in locked position with the first formed box located as just set forth, the actuation of the lever 232 will cause the expander rod 163 to be raised to elevate the follower plate 161, and at the same time rotation of the main drive shaft 183 through the hereinbefore described connections to lower the pressing plunger 175 into engagement with the box to force it from its holding frame 122. The follower plate 161 having come up to meet the box, now returns to its lowered initial position within the pressing form 145 and expanding the same as the box settles therearound.

The several pressing plates 164 and 165 are now moved toward their respective sides of the pressing form 145 and the sides of the box engaged therebetween, the pressing die 174 co-operates with the pressing plates to press the bottom of the box. After the box has been held in this manner a predetermined length of time, the pressing plates are retracted, the pressing die with its plunger 175 elevated, and the follower plate 161 raised, the form 145 being at the same time contracted, to return the box to its holding frame 122 still located in proper position to receive the same.

Upward movement of the pressing plunger 175 causes the trip finger 208 to release the detent 204 from the adjacent latch plate 203 so that the conveyer may again be rotated a distance of ninety degrees. As the holding frame 122 carrying the first formed box reaches its new position caused by the last mentioned rotation of the conveyer, the trip 133 thereof engages the releasing finger 220 to thereby permit the box to drop upon the chute 218.

This completes the formation of one box from a pair of box blanks, and from this description of the operation, it will be appreciated that the machine is capable of continuous formation of boxes, or in other words there may be several boxes in various stages of completion passing through the machine at the same time. Although the conveyer is illustrated as being provided with only four box holding frames 122, it is obvious that by slight modifications the other portions of the machine might be easily equipped to take care of a conveyer having more than four holding frames and thus increase the rapidity of box formation. Various other minor changes may be made in the form and proportion of the several parts of the machine without departing from or sacrificing any of the principles of operation or features of construction.

I claim:

1. A multiple stage box making machine, one stage including a blank receiving means, relatively stationary end and flap folders, movable side folders, a reciprocative plunger, means for moving the plunger to engage said blank with said folders, the side folders being movable with the blank and in a corresponding direction, a second stage including means for pressing the folded blank into permanent box form, and means for conveying the folded blank from the first stage to the other.

2. A multiple stage, a multiple ply box making machine, one stage including a pair of spaced blank receiving means, one to receive an inner blank and the other a cover blank, a movable forming member, end, side and flap folders for the inner blank, end, side and flap folders for the cover blank, means for moving the forming member to successively engage the inner blank with its folders and the cover blank with its folders to wrap the same about the initially folded inner blank, a second stage including means for pressing the two-ply box into permanent shape, and means for moving the box from the first stage to the second.

3. A multiple stage, multiple ply box making machine, one stage including a pair of box blank tables, one for an inner blank and the other for a cover blank, a blank receiving means for each of said blanks, means for moving the inner blank from its table to its receiving means, means for simultaneously moving the cover blank from its table to its receiving means and coating one surface with adhesive, end, side and flap folders for the inner blank, end, side and flap folders for the cover blank, a movable forming member, means for shifting the forming member to successively carry the inner blank into engagement with its folders and the cover blank and then moving the cover blank into engagement with its folders, a second stage including means for pressing the folded blanks into permanent box form, and means for conveying the folded blanks from the first stage to the other.

4. A multiple stage box making machine, a movable conveyer for transferring a box from one stage to a second stage, said conveyer having a box seat, the first stage including means for forcing a box into said seat, the second stage including means for expelling the box from its seat prior to being operated upon, means for operating upon said box, means for returning the box to its seat after said operation, and means for moving the conveyer to shift its seat from one stage to the other.

5. A multiple stage box making machine, a movable conveyer for transferring a box from one stage to a second stage, said conveyer having a box seat, the first stage including means for forcing a box into said seat, the second stage including means for expelling the box from its seat prior to being operated upon, means for operating upon said box, means for returning the box to its seat after said operation; a discharge means, means for moving the conveyer to successively shift the seat from the first stage to the second stage and over the discharge means, and means for releasing the box from its seat when over the discharge means.

6. A multiple stage box making machine, a movable conveyer for transferring a box from one stage to a second stage, said conveyer having a box seat, the first stage including means for forcing a box into said seat, the second stage including means for expelling the box from its seat prior to being operated upon, means for operating upon said box, means for returning the box to its seat after said operation; means for moving the conveyer to shift its seat from one stage to the other, and means for locking the conveyer to retain the seat in either of its positions.

7. A box making machine including a relatively horizontal blank receiving tray, a substantially vertically disposed reciprocative forming member, a substantially vertically disposed carrying member, a folder fixed to said carrying member, means on the forming member for engagement with the carrying member to shift the latter therewith, and a trip for disengaging the means from said carrying member after the latter has been moved a predetermined distance to permit the same to return by gravity to its initial position.

8. A box making machine including a forming member, and a folder comprising a reciprocative rod movable relatively parallel to one of the faces of said forming member, a shoe carried by said rod to fold a flap portion of a box blank into engagement with said face, and means for reciprocating said rod.

9. A box making machine including a forming member, a supporting frame, a reciprocative rod slidably journaled in said supporting frame and movable relatively parallel to one of the faces of said forming member, a shoe carried by the rod to fold a flap portion of a box blank into engagement with said face of the forming member, an auxiliary flap folder pivoted to said supporting frame, means for reciprocating said rod, and a connection between the auxiliary flap folder and said rod whereby movement of the latter will shift the former toward or away from said face of the forming member.

10. A box making machine including a forming member, a supporting frame, a folder comprising a reciprocative rod slidably journaled in said frame and movable substantially parallel to one face of said forming member, an angle plate fixed to said rod, a shoe carried by one flange of said angle plate for folding a flap portion of a box blank against said face of the forming member, the other flange having a slot therein, an auxiliary flap folder comprising a lever having a shoe on one end, its other end being pivoted to said supporting frame, the intermediate portion of said lever being disposed through said slot in the angle plate, and means for reciprocating said rod to simultaneously move the first mentioned shoe parallel to said face of the forming member and the second mentioned shoe toward or away from said face.

11. A box making machine including a reciprocative forming member, a relatively stationary folder comprising a shoe disposed substantially parallel to one face of said forming member, a pressing plate pivoted to said shoe and normally disposed in the path of movement of said forming member to engage a second face thereof, and means for moving the forming member to engage a box blank carried thereby with said shoe and pressing plate, the latter being forced out of the path of said forming member subsequent to its engagement with the box blank.

12. A box making machine including a reciprocative forming member, a relatively stationary folder comprising a shoe disposed substantially parallel to one face of said forming member, a pressing plate slidably pivoted to said shoe and normally disposed in the path of movement of said forming member to engage a second face thereof, and means for moving the forming member to engage a box blank carried thereby with said shoe and pressing plate, the latter being forced out of the path of said forming member subsequent to its engagement with the box blank.

13. A box making machine including a movable forming member, means for folding the end, side and flap portions of a box blank about said member, and means for folding the edge flaps of said box blank inwardly of the sides and ends thereof comprising a supporting frame, a bell crank pivoted in said frame, the arms of the bell crank being substantially at right angles to each other, the free end of one of the arms being moved toward the edge flap of a box blank when the forming member moves the latter into engagement with the other arm, a folder finger carried by the arm which is moved toward said edge flap, and means for actuating said folder finger to engage a flap upon the movement of the last mentioned arm.

14. A box making machine including a movable forming member, means for folding the end, side and flap portions of a box blank about said member, and means for folding the edge flaps of said box blank inwardly of the sides and ends thereof comprising a supporting frame, a bell crank pivoted in said frame, the arms of the bell crank being substantially at right angles to each other, the free end of one of the arms being moved toward the edge flap of a box blank when the forming member moves the latter into engagement with the other arm, a folder finger carried by the arm which is moved toward said edge flap, a normally inactive lever carried by the bell crank and engageable with said folder finger, and a connection between said lever and the supporting frame whereby upon movement of the finger carrying arm of the bell crank toward the box blank, the finger will be actuated to fold said edge flap.

15. A box making machine including a movable forming member, means for folding the end, side and flap portions of a box blank about said member, and means for folding the edge flaps of said box blank inwardly of the sides and ends thereof comprising a supporting frame, a bell crank pivoted in said frame, the arms of the bell crank being substantially at right angles to each other, the free end of one of the arms being moved toward the edge flap of a box blank when the forming member moves the latter into engagement with the other arm, a pivoted folder finger carried by the arm of the bell crank movable toward said edge flap, a lever pivoted to the last mentioned arm and having one end engageable with a portion of said finger, a stop plate carried by the supporting frame, and a connection between said stop plate and the intermediate portion of the lever.

16. A box making machine including folding members, an expansile and contractile forming head composed of a plurality of sections, means for moving said head through said folding members, means for expanding said head prior to passing through said members, and means for contracting said head after passing through said folding members.

17. A box making machine including blank folding means, and a conveyer comprising a frame, a plurality of bell cranks carried by said frame, a folded box blank being adapted to engage the corresponding arms of said bell cranks to shift the other arms toward the sides and ends thereof, edge engaging fingers carried by the last mentioned arms, said fingers cooperating with the edges of said folded box blank upon movement of the arms carrying the same toward said sides and ends of the box blank, and means for moving the said last mentioned arms away from the sides and ends of the box blank to release the latter.

18. A box making machine including box blank folding mechanism, and a conveyer comprising a frame, a shaft journally carried by the frame, a plurality of bell cranks loosely fixed to said shaft, the corresponding arms of said bell cranks being engageable by a folded box blank, to shift the other arms toward the sides and ends thereof, edge engaging fingers carried by the last mentioned arms, said fingers co-operating with the edges of said folded box blank upon movement of the arms carrying the same toward said sides and ends of the box blank, and means for rocking the shaft to return the bell cranks to initial position to release the folded box blank.

19. A box making machine including box blank folding mechanism, and a conveyer comprising a frame, a shaft journally carried by the frame, a plurality of bell cranks loosely fixed to said shaft, a rocking lever carried by said shaft, a trip, and means for moving the conveyer to engage said lever with the trip to rock said shaft and release the box blank carried by the bell cranks.

20. A box making machine including pressing mechanism comprising a pressing form, a pressing plate movable toward and away from a face of the form, a pressing plunger movable toward and away from another face of the form, a rock shaft, a pair of cranks on said shaft, one being connected with the pressing plate, a drive shaft, an eccentric on said drive shaft, a connection between said eccentric and the other crank, a second rock shaft, a connection between said second rock shaft and the pressing plunger, a second eccentric on the drive shaft, a crank on the second rock shaft, a connection between said last mentioned crank and said second eccentric, and means for actuating the drive shaft to synchronously operate the pressing plate and pressing plunger.

In testimony that I claim the foregoing I have hereunto set my hand at Milwaukee, in the county of Milwaukee and State of Wisconsin.

GEORGE DIAMOND.